United States Patent [19]

Voelker

[11] 4,094,299
[45] June 13, 1978

[54] HELIOTHERMODYNAMIC SYSTEM

[76] Inventor: Percy Voelker, 455 Grant Ave., Brooklyn, N.Y. 11208

[21] Appl. No.: 626,368

[22] Filed: Oct. 28, 1975

[51] Int. Cl.² ............................ F24J 3/02; B64B 1/50
[52] U.S. Cl. .................................. 126/270; 126/271; 237/1 A; 244/33
[58] Field of Search ............... 126/270, 271; 237/1 A; 60/641; 165/107, 48; 98/58

[56] References Cited

U.S. PATENT DOCUMENTS

| 3,064,418 | 11/1962 | Sanders | 126/270 |
| 3,125,091 | 3/1964 | Sleeper, Jr. | 126/271 |
| 3,489,072 | 1/1970 | Secor | 98/58 |
| 3,919,998 | 11/1975 | Parker | 126/271 |
| 3,960,136 | 6/1976 | Moan et al. | 126/271 |
| 4,002,158 | 1/1977 | Radebold | 126/270 |

Primary Examiner—Kenneth W. Sprague
Assistant Examiner—James C. Yeung
Attorney, Agent, or Firm—Arthur T. Fattibene

[57] ABSTRACT

A system for harnessing solar energy utilizing an inflated balloon having a light transmitting portion and a lower portion thereof lined with a reflecting surface for concentrating the insident reflected solar radiation onto a solar boiler disposed within the balloon. The solar boiler includes a plurality of nested heating stages for progressively increasing the temperature and/or pressure of a working fluid. Each stage includes an outer light transmitting wall with the innermost stage having disposed therein a solar radiation absorption material. The nested stages in turn are enclosed by a light transmitting, low solar absorptive, thermal insulated jacket.

8 Claims, 4 Drawing Figures

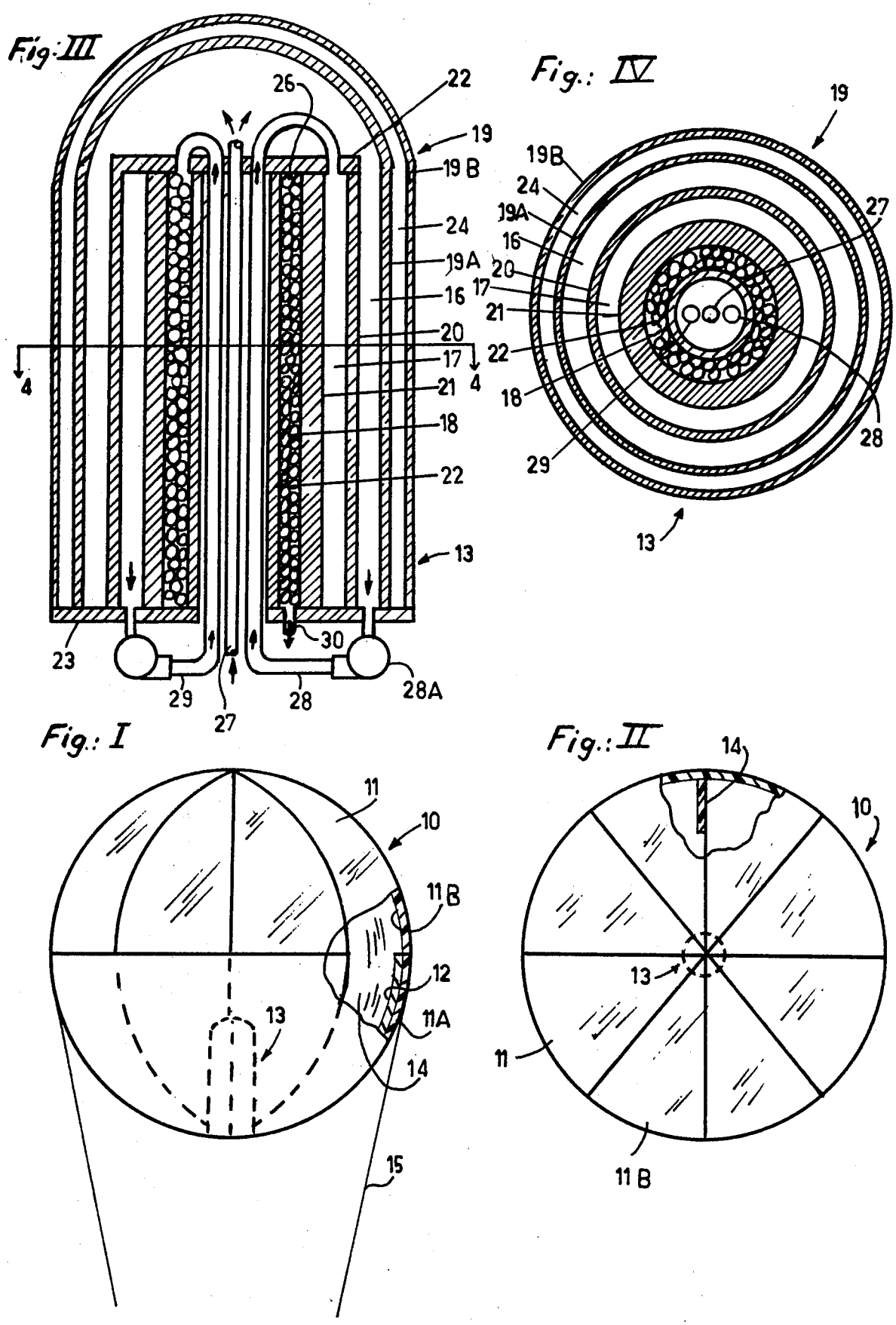

HELIOTHERMODYNAMIC SYSTEM

PROBLEM

Solar radiation it has been determined has a density of approximately 1394 watts per square meter with a possible 2% variation before the process of atmospheric absorption takes place. Meteorological conditions and other factors reduce the obtainable solar radiation density to less than 300 watters per square meter on less than 2500 hours per year with the known type of solar heating devices for the reason that the present solar heating devices are built and constructed close to the earth's surface. For this reason, the known solar heating devices cannot be subjected to the maximum solar radiation density. Thus the effectiveness of the known solar heating devices is limited to that solar energy which is not lost by atmospheric absorption and/or meteorological amount of the total obtainable solar radiation density.

OBJECTS

It is an object of this invention to produce a heliothermodynamic system constructed so as to utilize the maximum available solar radiation density.

Another object is to provide a solar heating device which can be located over largely populated densities so as to be close to the point of consumption of the energy produced thereby.

Another object is to provide a solar energy absorptive boiler capable of utilzing the limitless concentration of solar energy to achieve the maximum techncially feasible temperature and pressure of a working fluid.

Another object is to provide a heliothermodynamic system which includes a ballon suspended above the atmospheric absorption layer of solar energy and concentrating the high density solar radiation onto a solar boiler disposed within the balloon.

Another object is to provide for the harnessing of solar energy above the clouds where the losss of solar energy by atmospheric absorption is the least.

BRIEF SUMMARY OF INVENTION

The foregoing objects and other features and advantages are attained by a heliothermodynamic system which includes a balloon having a spherical or elliptical configuration having an upper light transmitting portion and a lower light reflective portion. The light transmitting portion permits solar radiation to penetrate inside the balloon whereupon the solar radiation is reflected in a concentrated manner by the reflective lower portion onto an absorption device or heat receiver.

The heat receiver comprises a solar boiler having a series of nested heating stages for progressively increasing the temperature and/or pressure of a working fluid as the fluid is successively circulated through the respective stages. Each stage includes a light transmitting outer wall and wherein the innermost stage has disposed therein a solar absorption material. The nested stages in turn are enclosed in a low absorptive, light transmitting insulated jacket so as to minimize any heat loss while achieving maximum light transmitting therethrough.

FEATURES

A feature of this invention resides in the provision of a system for harnessing solar energy wherein relative large concentrating heliostat reflecting surfaces can be located so as to utilize the maximum available solare energy radiation.

Another feature resides in the provision of a solar boiler having a series of nested heating stages enclosed in a thermo insulated light transmitting jacket wherein solar energy is utilized to progressively increase the temperature and pressure of a working fluid under the condition of maximum solar radiation density.

Another feature resides in the provision of floating a ballon having a concentrating heliostatic surface above the atmospheric solar absorbing layers and concentrating the solar energy on a solar boiler for heating a working fluid in successive stages.

The foregoing features and other advantages will become more readily apparent when considered in view of the drawings and specification in which:

FIG. 1 is a side elevation view of a heliothermodynamic system embodying the present invention.

FIG. 2 is a top view of FIG. 1.

FIG. 3 is a vertical sectional view of a solar boiler utilized in the present invention.

FIG. 4 is a plan sectional view taken along line 4—4 on FIG. 3.

DETAILED DESCRIPTION

Referring to FIGS. 1 and 2, there is shown a heliothermodynamic system 10 embodying the present invention. The system or apparatus 10 comprises a balloon 11 which comprises a lower hemispherical portion 11A which is lined or coated with a reflecting surface 12. The upper portion or half 11B of the ballon is formed of a light transmitting or transparent material.

In the illustrated embodiment the ballon 11 is formed of a suitable plastic material in which the bottom portion 11A may be mirror coated by well known coating techniques, e.g., metallizing, etc. The upper portion 11B is formed of a clear or transparent material so as to permit the insident solar radiation to impinge onto the coated reflecting surface 12 whereby the solar radiation is reflected in a concentrated manner toward an absorption device; e.g., a solar boiler 13 as will be hereinafter described. The balloon thus described defines a solar energy concentrating heliostatic mirror which is generally spherice or spheroid in shape.

To provide for additional structional stability, the interior of the balloon 11 can be reinforced by webs or sectors 14 which are spaced about the vertical axis of the balloon. It will be noted that the webs or sectors 14 are cresent shaped and need only to extend a fractional amount toward the central vertical axis.

It will be understood that the balloon can be inflated with a lighter than air gas so that the balloon can be floated or suspended above the earth and at an elevation where atmospheric absorption of solar energy is reduced to a minimum. Suitable cables 15 or other means are provided for maintaining the balloon in position relative to earth.

With the construction described, it will be noted that the balloon can be varied in size depending upon the amount of solar energy required for a particular application. Thus balloon of exceeding large proportions are contemplated and/or feasible, e.g., balloons having diameters of hundreds and/or thousands of feet.

The balloon type of heliostatic mirror described not only has an economical advantage over the known forms of concentrating helistats, it is also made to float over the power consumming centers and above the atmospherice absorption centers.

FIGS. 3 and 4 illustrate a heat absoption device or solar boiler 13 which is disposed within the balloon. As shown, the solar boiler 13 comprises a plurality of nested stages wherein the working fluid can be heated in progressive stages by the concentration of solar radiation thereon. In the illustrated embodiment the solar boiler 13 has three heating stages, e.g., 16, 17, and 18; which stages are all enclosed or encased within a thermo insulated jacket means 19 formed of a good light transmitting and low solar adsorption material, e.g., glass, silica and the like.

As shown, the respective heating stages 16, 17, and 18 are defined by concentrically disposed cylinders, e.g., glass cylinders wherein the first stage 16 is defined by the inner wall 19A of the thermo jacket means 19 and the outer most concentric cylinder wall 20. The second stage 17 is defined by the annular space formed between cylinder walls 20 and 21. The third stage 18 is defined by the space formed between cylinder walls 21 and 22.

As shown, cylinders 20, 21 and 23 which define the second and third stages 17 and 18 are connected between end plates 22 and 23. Enclosing the concentric cylinders 20, 21 and 22 is the thermo insulated jacket means 19. The jacket means includes spaced apart jacket members 19A and 19B to define a vaccum space or chamber 24 of negative pressure therebetween. It will be understood that the vaccum chamber 24 and stages 16, 17, and 18 are sealed fluid tight with respect to one another.

In accordance with this invention, the jacekt means is composed of jacket members 19A and 19B that are formed of good light transmitting and low absorption material, such as glass so as to permit concentrated solar radiation penetration therethrough. The respective cylinders 20 and 21 are also formed of good light transmitting material such as glass. Wall 22 may be formed of glass or any other type of material including metal since it is not necessary that wall 22 be formed of a light transmitting material.

Disposed in the space defining the third stage 18 there is disposed a radiation absorption material, e.g., glass pebbles, fritters or dark bodies 26 to form a porous or open structure having a large ratio of heat transfer surface and which functions to absorb insident solar radiation. The large ratio of heat transfer surfaces thus also functions to maximize the thermal exchange between the working fluid and the absorption material 26.

The working fluid is introduced into the first stage by a conduit 27 extending through the innermost cylinder 22. In operation the partially heated working fluid in the first stage 16 is circulated to the second stage by interconnecting pipe means 28. A pump 28A is disposed in pipe 28 to provide for positive circultion of the working fluid from the first stage 16 to second stage 17. Thus the partially heated fluid of the first stage is further heated in the second stage. The fluid from the second stage 17 can be further heated by circulating the fluid of the second stage to the third stage by means of interconnecting conduit 29.

The heated fluid from the third stage is then directed by means of an outlet pipe 30 to a suitable power source, e.g., a turbine electric generator (not shown) to produce electric energy. While the illustrated embodiment illustrates the working fluid being progressively heated in three stages, it will be understood that the number of stages can be varied depending upon design considerations of the system 10.

From the foregoing it will be noted that the temperature and pressure of the working fluid is the least in the first stage. Accordingly, the wall thickness of the walls 19A and 20 defining the first stage is the least in thickness of the respective walls; and therefore, reduces solar radiation absorption to a minimum. Also since the first stage is subjected to the lowest temperatures, a minimum of heat loss is effected thereby. Also the arrangement is such that the first stage will absorb the heat losses from the innermost stages. Since the thermal loss is confined in the first stage, the wall thickness of wall 21 of the second stage can be increased so that the pressure of the working fluid can be incremented while the pressure differential acting on the common wall 20 between the first and scond stage can be minimized. The outer wall 22 of the third or innermost stage 18 can be reduced in thickness so as to be commensurate with the pressure of the working fluid in the third or innermost stage as the pressure of the fluid in the third stage acts thereon with a compressive force. As the incident solar radiation is completely absorbed within the innermost or third stage 18, and due to the large ratio of heat transfer surfaces, the fluid is heated to its highest temperature and pressure within stage 18.

The end plates 22 and 23 can be formed of glass, metal or composite materials and the function of the end plates 22 and 23 is to withstand and contain the fluid pressure in the various stages 16, 17, and 18, and to compensate for any thermal expansion of the various cylinders.

The vaccum jacket means 19 enclosing the heating stages further assures a minimum of heat loss from the first stage 16.

From the foregoing it will be noted that the wall thickness; temperature and pressure of the respective stages increase toward the inside. By floating or suspending the balloon above the absorbing atmosphere maximum utilization of solar radiation can be achieved to heat the working fluid circulating through the respective stages of the solar boiler 13. Also, the lower hemisphere 11A of the balloon 11 defines a heliostatic mirror enabling the reflection of the maximum amount of solar energy in a concentrating manner onto the solar boiler 13.

While the invention has been described with respect to a particular embodiment, it will be understood that variations and modifications may be made without departing from the spirit or scope of the invention.

While the embodiment described is desired to be floated above the absorptive layers of the atmosphere, it will be understood that the balloon heliostat can function at lower elevations and/or on earth. However, while effective, the density of solar radiation being concentrated thereby will be reduced as the balloon is located closer to earth.

What is claimed is:

1. A heliothermodynamic system for harnessing solar energy comprising:
   a balloon adapted to be floated in the upper reaches of the atmosphere where the atmospheric absorptions of solar energy is minimized,
   means for maintaining said balloon inflated,
   means for maintaining said balloon in spaced relationship relative to earth,
   said balloon having a transparent portion for transmitting solar light into the interior of said balloon,
   a light reflector covering an internal portion of said balloon opposite said transparent portion for concentrating the incident reflected solar radiation toward a focal area thereof, and a heat receiver located in the focal area of said light reflecting portion of said balloon, said heat receiver comprises a solar boiler having a plurality of nested, serially connected heating stages including an inner most stage and an outermost stage, and solar radiation absorption means disposed in said innermost stage of said nested heating stages, and a light transmitting jacket means enclosing said nested stages to define an outermost heating stage, surrounding said nested stages, said jacket means including a pair of spaced apart light transmitting jackets wherein the space between said jackets defines an area of negative pressure.

2. A heliothermodynamic system for harnessing solar energy comprising:

a balloon adapted to be floated in the upper reaches of the atmosphere where the atmospheric absorptions of solar energy is minimized, means for maintaining said balloon inflated, means for maintaining said balloon in spaced relationship relative to earth, said balloon having a transparent portion for transmitting solar light into the interior of said balloon, a light reflector covering an internal portion of said balloon opposite said transparent portion for concentrating the insident reflected solar radiation toward a focal area thereof, and a heat receiver located in the focal area of said light reflecting portion of said balloon, said heat receiver comprises a solar boiler having a plurality of nested, serially connected heating stages, and a light transmitting jacket means enclsoing said nested stages to define an outermost heating stage, surrounding said nested stages, said jacket means including a pair of spaced apart light transmitting jackets wherein the space between said jackets defines an area of negative pressure said solar boiler including a pair of spaced apart end plates, a plurality of nested spaced apart tubular members interconnected between said end plates to define said plurality of nested heating stages, means for serially connecting said nested stages into communication with one another, a solar radiation absorptive means disposed in the innermost stage of said nested stages, means for serially connecting said outermost heating stage in communication with the outermost stage of said nested heating stages, means for introducing a working fluid into said outermost stage, means for circulating said working fluid serially through each of said connected stages whereby said fluid is progressively heated as it flows through each said stage.

3. The invention as defined in claim 2 wherein said working fluid is progressively pressurized at it flows through each said stage.

4. The invention as defined by claim 3 wherein the means for serially connecting the nested heating stages extend through the innermost member of said nested members.

5. The invention as defined in claim 2 wherein said jacket means and the tubular members of said solar boiler are formed of glass.

6. The invention as defined in claim 2 wherein said nested tubular members comprise spaced apart concentrically disposed cylinders, said cylinders defining nested annular heating stages, and said means for introducing said working fluid into said outermost heating stage extending through the innermost member of said nested members.

7. The invention as defined in claim 2 wherein the wall thickness of the respective nested stages increase in thickness from the outermost stage toward the inner most stage.

8. The invention as defined in claim 2 and including solar radiation absorption means disposed in the innermost stage of said nested stages to present optimum surface area to maximize thermal exchange with the working fluid.

* * * * *